(12) United States Patent
Al Nofaie

(10) Patent No.: US 11,617,631 B2
(45) Date of Patent: Apr. 4, 2023

(54) SURGICAL GUIDE TOOL FOR SINGLE DENTAL IMPLANT POSITIONING

(71) Applicant: KING SAUD UNIVERSITY, Riyadh (SA)

(72) Inventor: Hourya Sanat M. Al Nofaie, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 16/190,487

(22) Filed: Nov. 14, 2018

(65) Prior Publication Data

US 2020/0146772 A1 May 14, 2020

(51) Int. Cl.
*A61C 1/08* (2006.01)
*A61C 8/00* (2006.01)

(52) U.S. Cl.
CPC ............ *A61C 1/084* (2013.01); *A61C 8/0089* (2013.01)

(58) Field of Classification Search
CPC ........... A61C 1/084; A61C 1/082; A61C 1/85; A61C 8/0089; A61C 8/009
USPC .............................. 433/72, 75, 76; 285/120.1
See application file for complete search history.

(56) References Cited

U.S. PATENT DOCUMENTS

| | | | |
|---|---|---|---|
| 2,744,327 A * | 5/1956 | Birnbaum | A61C 1/085 433/116 |
| 4,355,979 A * | 10/1982 | Weissman | A61B 17/1728 433/225 |
| 6,971,877 B2 | 12/2005 | Harter | |
| 7,097,451 B2 | 8/2006 | Tang | |
| 7,905,726 B2 | 3/2011 | Stumpel | |
| 8,920,167 B2 * | 12/2014 | Akutsu | A61B 6/032 433/72 |
| 2009/0202959 A1 * | 8/2009 | Ajlouni | A61C 1/084 433/76 |
| 2009/0286201 A1 | 11/2009 | Choe | |
| 2013/0171587 A1 * | 7/2013 | Akutsu | A61C 1/084 433/173 |
| 2015/0351866 A1 | 12/2015 | Thompson, Jr. et al. | |
| 2016/0331489 A1 * | 11/2016 | Sanders | A61C 1/082 |
| 2017/0014975 A1 * | 1/2017 | Edge | B25B 1/2457 |

* cited by examiner

*Primary Examiner* — Yogesh P Patel
*Assistant Examiner* — Stephen R Sparks
(74) *Attorney, Agent, or Firm* — Nath, Goldberg & Meyer; Richard C. Litman

(57) ABSTRACT

The surgical guide tool for single dental implant positioning includes an adjustable U-shaped frame having an inner member and an outer member. The inner member of the frame includes a first arm and a second arm that extends normal to the first arm. The outer member of the frame includes a first arm and a second arm that extends normal to the first arm. The first arm of the outer member includes an inner cavity for slidably receiving the first arm of the inner member. The first arm of the inner member can be moved within the cavity to adjust the size of the frame. A ring, attached to the second arm of the inner member, includes a circular wall with a central aperture extending therethrough. The central aperture is configured for receiving a drill bit therethrough for properly positioning the drill bit on the jawbone.

8 Claims, 5 Drawing Sheets

SURGICAL GUIDE TOOL FOR SINGLE DENTAL IMPLANT POSITIONING

BACKGROUND

1. Field

The disclosure of the present patent application relates to oral surgery instruments and particularly to a surgical guide tool for placing single dental implants.

2. Description of the Related Art

Dental implants are an increasingly popular option for patients with missing teeth resulting from excessive decay, bone or gum damage, or accidents causing physical displacement and the like. Dental implants provide an attractive alternative to dentures because they look natural and require less maintenance. Implants further provide a stronger biting surface and allow patients to resume their normal diets.

Compared to dentures and the like, however, dental implant procedures involve costly and complex surgical work. More accurately, dental implant procedures generally involve the placement of a dental implant or abutment in the underlying jawbone as a foundation, and the subsequent attachment of a prosthetic to the implant above the gum line. Generally, a dental osteotomy must be performed to prepare the bone for placement of the implant in order to place the implant. The implant is then inserted and fixed into the bone where it serves to hold the dental prosthetic. Accordingly, the osteotomy and implant placement must be precise.

The most difficult and skill-intensive part of the implant procedure is generally positioning the drill to create the hole in the jawbone that will receive the implant. The hole must be formed at a precise location relative to adjacent teeth for a natural, attractive look. The hole must be properly defined in the bone to ensure a solid base for the prosthetic. Inaccuracies in placing the hole can damage nearby vital structures such as nerves, blood vessels, sinus and neighboring teeth. If the hole is not defined in the appropriate position in the jawbone, further drilling may be necessary. Even more troublesome, if the bone is mistakenly removed, new bone may have to be grafted or added to the site and let to heal for 3-6 months before a new attempt can be made.

For these reasons, implant procedures typically require the expertise of oral surgeons and usually are avoided by general dentists. Even some oral surgeons hesitate to do implant procedures because of the unique skills and experience required. As such, it is highly desirable to reduce the risk of mistakenly drilling in an incorrect position.

Many tools and methods exist for increasing the accuracy, reliability, and ease with which a surgeon can perform the drilling operation. The most popular technique remains free-hand alignment. In the case of free-hand drilling, a surgeon draws upon his or her experience to determine the proper trajectory and final location of the implant. Not only does this require a steady hand, but the surgeon must also make a judgment as to where the bone is located below gum surface. Free-hand drilling also presents safety hazards and accuracy problems. Although the surgeon can initially determine where to drill, during the drilling procedure, the drill bit can "jump" or slip. The drill bit can also "walk" or move before the tip of the bit grabs or digs into the bone. Additionally, free-hand drilling requires the surgeon to act without a complete view of the mouth interior and implant site.

Modern techniques employ the use of drill guides that can be secured to the patient's jaw. The guides allow a clinician to set an exact location to be drilled, and then drilling merely requires feeding the drill through the guide. However, many guides require making a mold of teeth which requires a substantial amount of time. Other guides that do not use a mold of teeth have been known to shift out of place during the procedure, resulting in an improper hole.

Thus, a surgical guide tool for placing single dental implants solving the aforementioned problems is desired.

SUMMARY

The surgical guide tool for single dental implant positioning includes an adjustable U-shaped frame that can be wedged between teeth in gaps of different sizes. The frame has an inner member and an outer member. The inner member of the frame is generally L-shaped and includes a first arm and a second arm that extends normal to the first arm. The outer member of the frame is also generally L-shaped and includes a first arm and a second arm that extends normal to the first arm. The first arm of the outer member includes an inner cavity for slidably receiving at least a portion of the first arm of the inner member. The first arm of the inner member can be moved within the cavity by a user to adjust the size of the frame. The guide tool also includes a ring that can be releasably attached to the second arm of the inner member. The ring includes a circular wall with a central aperture extending therethrough. The central aperture is configured for receiving a surgical tool, such as a drill bit, and guiding the drill bit to a desired location of the jawbone.

These and other features of the present disclosure will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The surgical guide tool 100 for single dental implant positioning can be used for guiding a clinician's drill to a desired position in the jawbone between two adjacent teeth.

Figure 1:
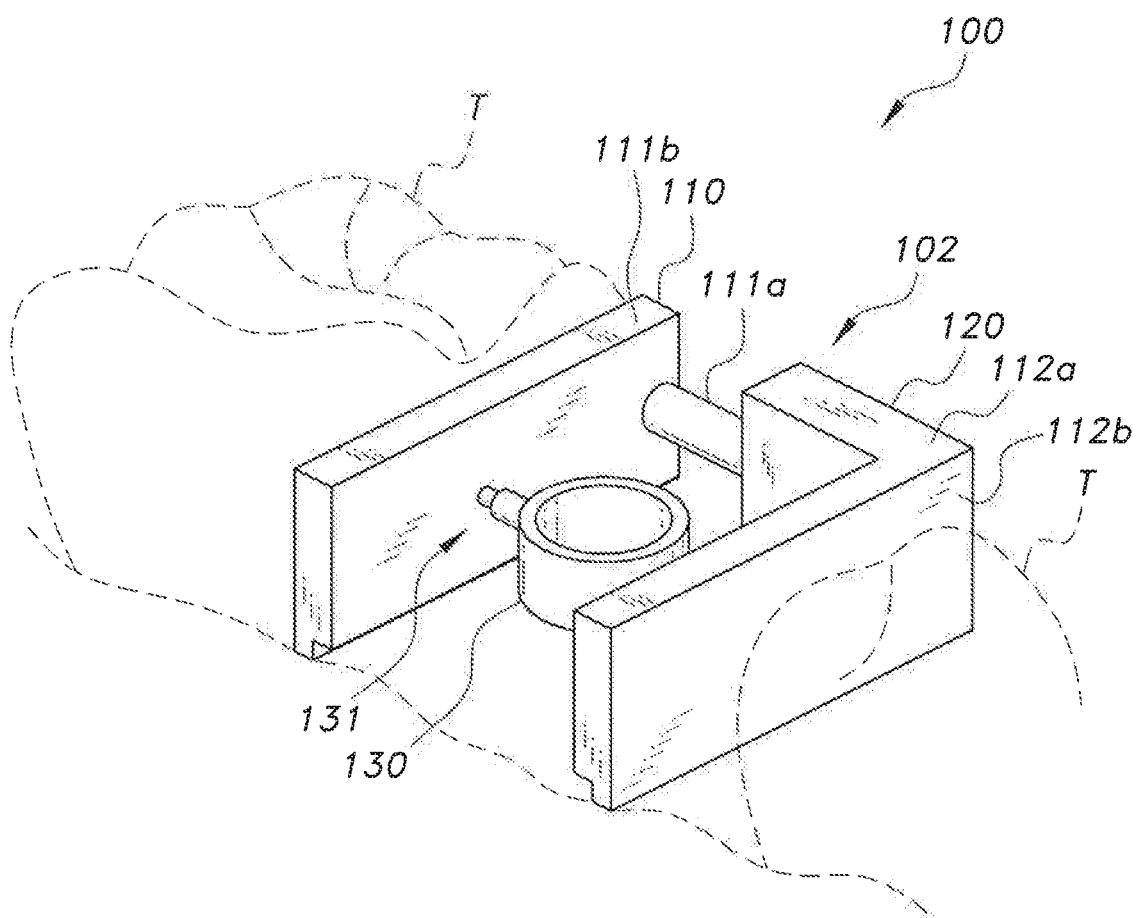
FIG. 1 is an environmental, perspective view of surgical guide tool according to the present teachings.

The guide tool 100 includes an adjustable generally U-shaped frame 102 that can be wedged between teeth in gaps of different sizes. FIG. 1 shows the guide tool 100 wedged in a gap between two teeth T as it would be positioned in use. The frame 102 has an inner frame member 110 and an outer frame member 120. The inner frame member 110 is generally L-shaped and includes a first arm 111a and a second arm 111b that extends normal to the first arm 111a. The outer frame member 120 is also generally L-shaped and includes a first arm 112a and a second arm 112b that extends normal to the first arm 112a. The first arm 112a of the outer frame member 120 includes an inner cavity 122 for slidably receiving at least a portion of the first arm 111a. The first arm 111a can be cylindrical. The first arm 111a can be moved within the cavity 122 by a user to adjust the size of the frame 102. The adjustable size of the frame 102 allows the tool guide 100 to accommodate different sized tooth gaps.

An inner cavity wall of the first arm 112a frictionally engages the outer portion of the first arm 111a to prevent undesired movement of the first arm 111a. In an embodiment, the cavity wall of the first arm 112a and/or the outer surface of the first arm 111a is coated with a high friction material. The frame 102 may include a padding material on a lower surface thereof to minimize damage to the gums during the procedure.

The guide tool 100 also includes a ring 130 that can be detachably connected to the second arm 111b of the inner frame member 110. The figures show the ring 130 attached to the second arm 111b of the inner frame member 110. It should be understood, however, that the ring 130 may be attached to the second arm 112b of the outer frame member 120 instead. The ring 130, with a central aperture 132 extending therethrough, includes an outer surface 129 and an attachment portion 131. The central aperture 132 is configured for receiving a surgical tool, such as a drill bit, and guiding the surgical too to a desired location of the jawbone. The attachment portion 131 includes an adjustable connector 133 that extends between the outer surface 129 and the second arm 111b. As described herein, the adjustable connecter 133 can be adjusted to move the ring 130 towards or away from the second arm 111b.

Figure 2:
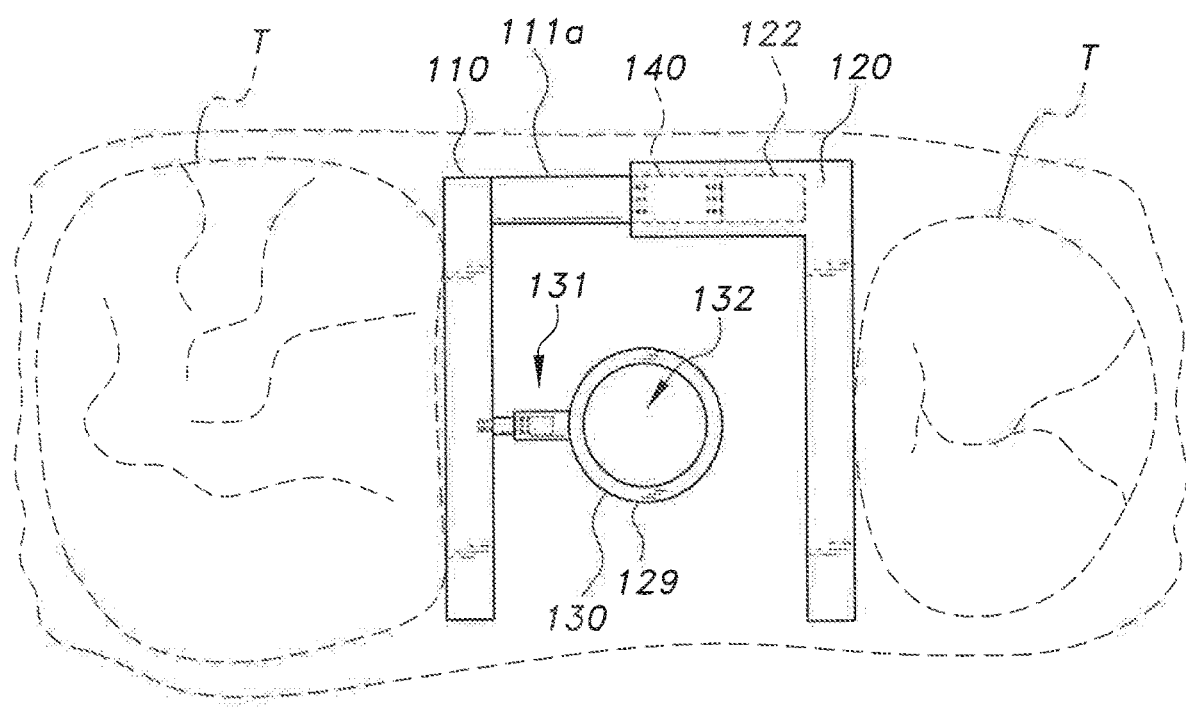
FIG. 2 is an environmental, plan view of the surgical guide tool according to the present teachings.

FIG. 2 shows an environmental, plan view of the guide tool 100 in use. The inner and outer members 110, 120, respectively, can be adjusted to press against the two adjacent teeth T resulting in a wedge lock that secures the guide tool 100 in place. The ring 130 is positioned by the user so that an approximate center of aperture 132 is aligned with the portion of the jaw that has been selected for drilling (FIG. 2).

Figure 3:
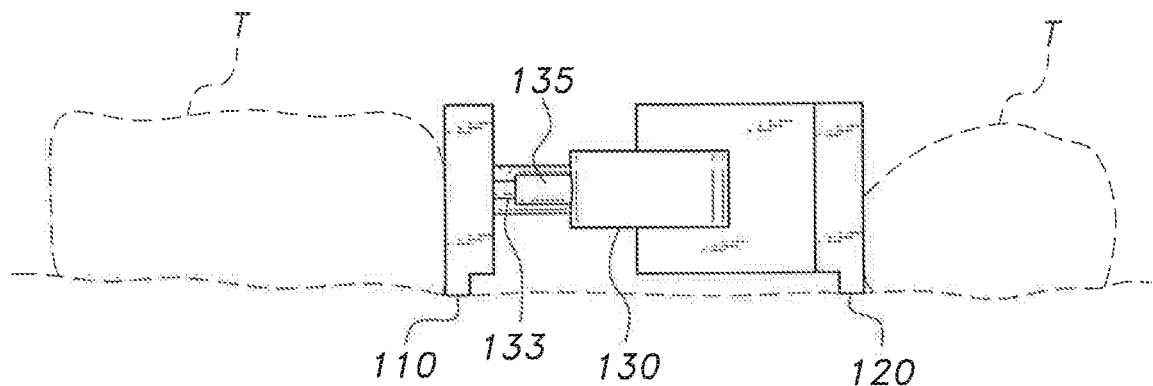
FIG. 3 is an environmental, side view of the surgical guide tool according to the present teachings.
Figure 4:
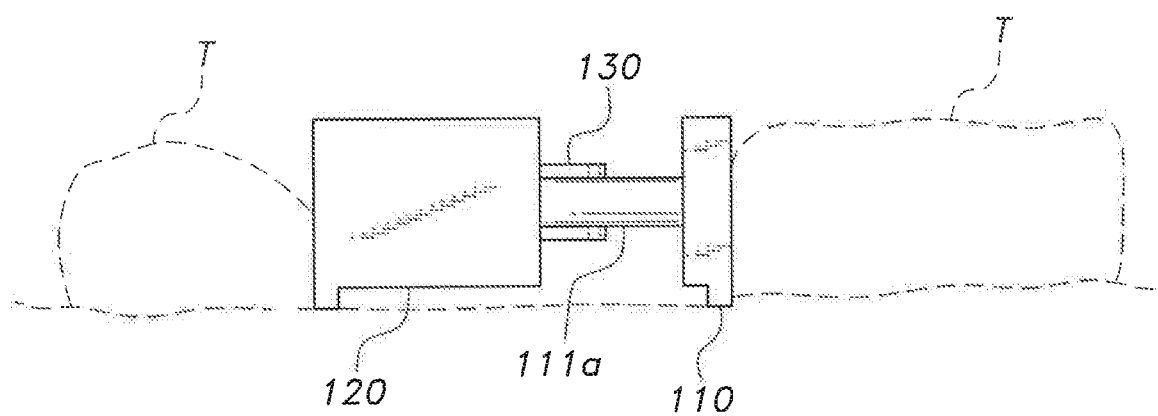
FIG. 4 is an environmental, side view of the surgical guide tool according to the present teachings.

As seen in FIGS. 3 and 4, the inner and outer frame members 110, 120, respectively, extend upwards from the gum to a height substantially level with the top of the adjacent teeth T. The ring 130 can have a height equal to about half the height of the inner and outer members 110, 120. In an embodiment, the inner and outer members 110, 120 can each have a height ranging from about 5 mm to about 12 mm. It should be understood, however, that the inner and outer members 110, 120 and the ring 130 can have any suitable height. The high friction coating that can be applied to the first arm 111a and the first arm 112a may have a coefficient of friction above 0.5. A coefficient of friction is determined by taking the force caused by the friction and dividing it by the load on the friction causing surface. In cases where a stronger friction lock is necessary, the coefficient of friction can be increased to above 1.

Figure 5:
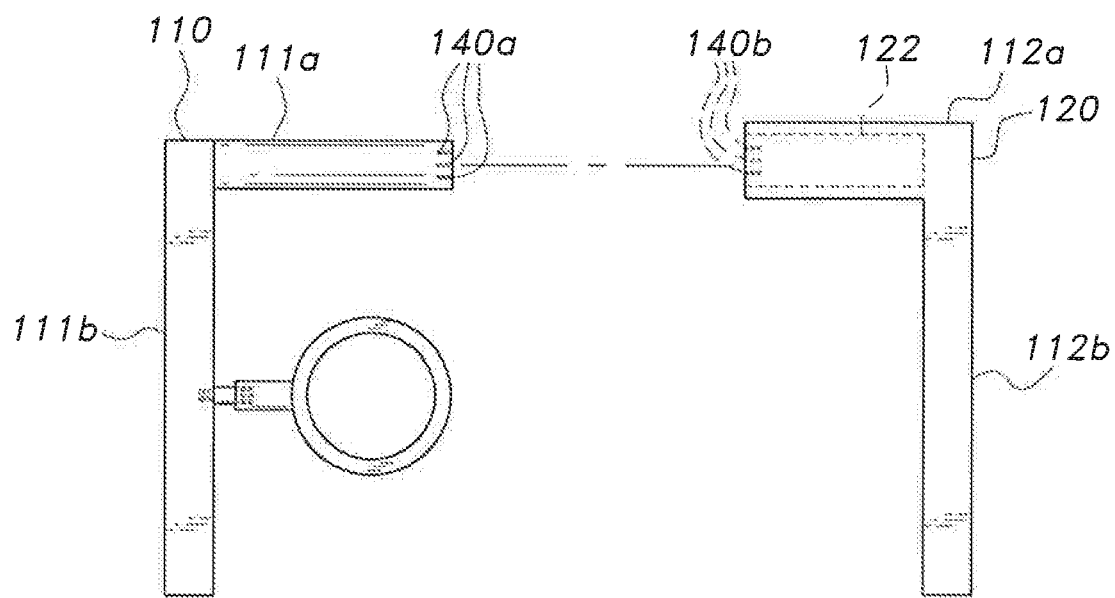
FIG. 5 is a top view of the surgical guide tool according to the present teachings, showing the inner frame member and the outer frame member detached.

FIG. 5 shows the inner and outer frame members 110, 120 when separated from each other. As shown, the outer surface of the first arm 111a includes connecting member 140 having projections 140a extending from a terminal end thereof and the outer surface of the first arm 112a includes slots 140b defined at a terminal end thereof. When the inner frame member 110 is pulled away from the cavity 122, the slots 140b can receive and maintain the projections 140a therein to prevent complete detachment of the first arm 111a from the second arm 112a.

Figure 6:
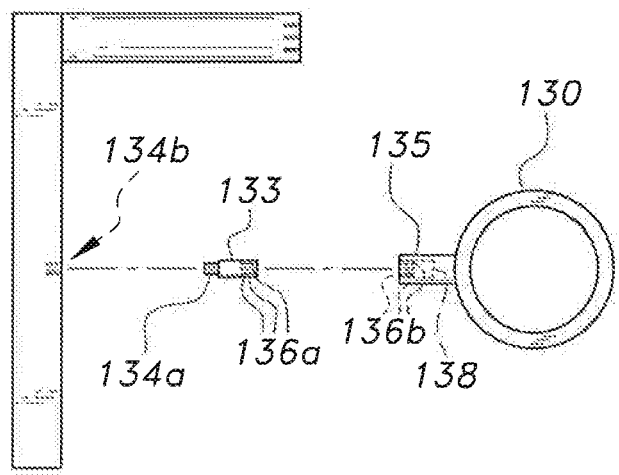
FIG. 6 is an exploded view of a portion of the surgical guide tool, showing the ring separated from the inner frame member.

FIG. 6 shows the attachment portion 131 removed from the second arm 111b of the inner frame member 110. As shown, the attachment portion 131 includes an adjustable connector formed as an inner cylindrical member 133 (hereafter referred to as "inner cylindrical member"), an outer cylindrical member 135 that slidably receives the inner cylindrical member 133 in an inner cavity 138 thereof, and a screw 134a. The screw 134a is configured to threadedly engage a threaded aperture 134b in the second arm 111b. An inner cavity wall of the outer cylindrical member 135 frictionally engages an outer portion of the inner cylindrical member 133 to prevent undesired movement of the inner cylindrical member 133. The position of the ring 130 can be adjusted by the user by sliding the inner cylindrical member 133 in an appropriate direction within the inner cavity 138 so that, e.g., an approximate center of aperture 132 is aligned with the portion of the jaw that has been selected for drilling.

Figure 7A:
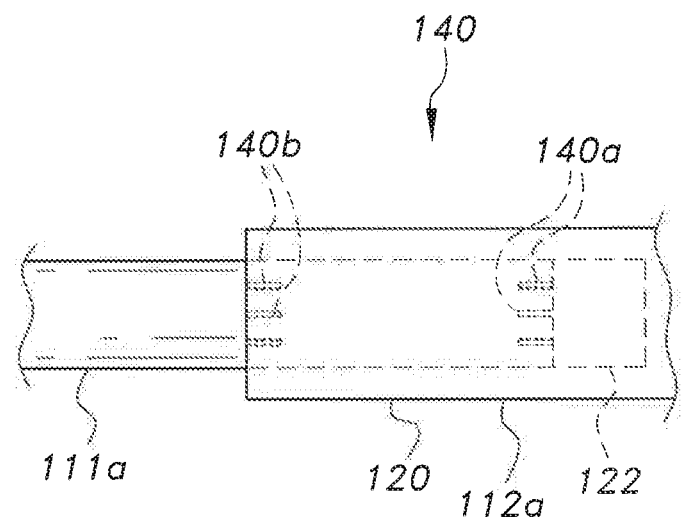
FIG. 7A is a sectional, top view of the first arm of the inner frame member positioned substantially within the first arm of the outer frame member.
Figure 7B:
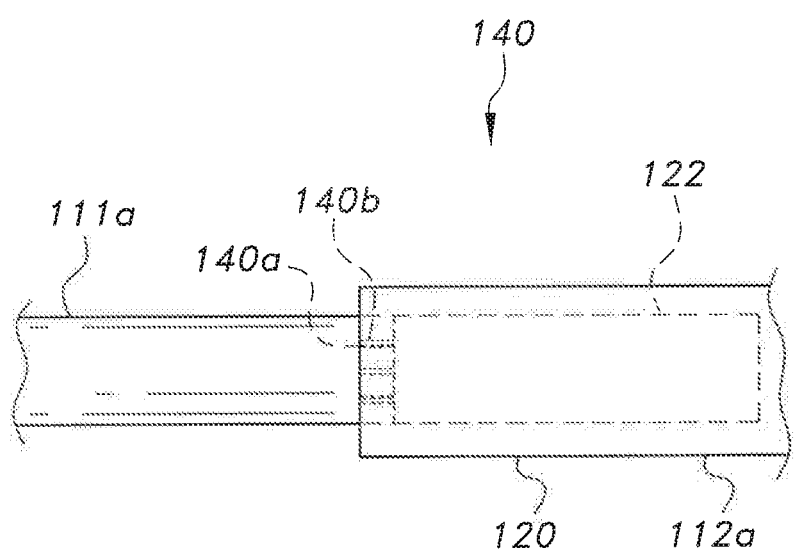
FIG. 7B is a sectional, top view of the first arm of the inner frame member having only one end positioned within the first arm of the outer frame member.

One end of the inner cylindrical member 133 includes projections 136a extending from an outer surface thereof. An end of the outer cylindrical member 135 includes slots 136b defined therethrough. When the inner cylindrical member 133 is pulled away from the cavity 138, the slots 136b can receive and maintain the projections 136a therein to prevent complete detachment of the inner cylindrical member 133 from the outer cylindrical member 135. FIG. 7A shows the inner cylindrical member 133 positioned almost completely within the cavity 138. FIG. 7B shows the attachment portion 131 at maximum extension. In this position, only the projections 136a of the inner cylindrical member 133 remain in the cavity 138, as they are secured by the slots 136b.

As discussed above with respect to the first arm 111a and the first arm 112a of the frame 102, a high-friction coating can also be applied to the inner cavity wall of the outer cylindrical member 135 and the outer surface of the inner cylindrical member 133.

A method of installing a dental implant includes identifying a position in the jaw between adjacent teeth of a patient to secure an implant post; placing the frame 102 of the adjustable surgical guide tool 100 in a gap between the teeth such that the tool is firmly wedged between the teeth; fastening the ring 130 to the frame 102; adjusting the ring 130 by slidably moving the inner cylindrical member 133 and the outer cylindrical member 135 with respect to each other; inserting a drill bit through the aperture in the ring 130; drilling a hole in the identified position of the jaw; and installing a post and implant into the hole.

It is to be understood that the surgical guide tool for single dental implant positioning is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A surgical guide tool configured for single dental implant positioning, comprising:

an adjustable U-shaped frame consisting of an inner frame member and an outer frame member, each of the inner frame member and the outer frame member having a first arm and a second arm, each first arm extending normal to each second arm, the first arm of the inner frame member being slidably received within a cavity in the first arm of the outer frame member thereby defining a U-shaped frame, wherein the second arm includes a single threaded recess located at a predetermined position along the second arm; and a ring, the ring consisting of a circular wall, an aperture extending through the circular wall, and an adjustable connector attachment portion extending from the circular wall to the second arm of the inner frame member, the attachment portion includes an adjustable connector having an outer cylindrical member, a screw, and an inner cylindrical member extending between the screw and the outer cylindrical member, the outer cylindrical member including an inner cavity for slidably receiving the inner cylindrical member, the screw being detachably connected to the second arm of the inner frame member at the single threaded recess.

2. The surgical guide tool according to claim 1, wherein one end of the first arm of the inner frame member comprises a plurality of projections extending from an outer surface thereof and one end of the first arm of the outer frame member includes a plurality of slots configured for receiving the plurality of projections of the inner frame member.

3. The surgical guide tool according to claim 1, wherein one end of the inner cylindrical member includes a plurality of projections extending from an outer surface thereof and one end of the outer cylindrical member includes a plurality of slots configured for receiving the projections of the inner cylindrical member.

4. The surgical guide tool according to claim 1, wherein at least one of an outer surface of the inner cylindrical member and an inner cavity wall of the outer cylindrical member includes a high friction coating.

5. The surgical guide tool according to claim 1, wherein at least one of an outer surface of the first arm of the inner frame member and an inner cavity wall of the first arm of the outer frame member includes a high friction coating.

6. The surgical guide tool according to claim 1, wherein the first arm of the inner frame member is cylindrical.

7. The surgical guide tool according to claim 6, wherein the first arm of the inner frame member frictionally engages an inner cavity wall of the first arm of the outer frame member.

8. The surgical guide tool according to claim 1, wherein the inner and outer frame members have a height ranging from 5 mm to 12 mm.

* * * * *